(12) United States Patent
Frallicciardi (10) Patent No.: US 9,487,343 B2
(45) Date of Patent: Nov. 8, 2016

(54) SIM MODULE

(71) Applicant: STMicroelectronics S.r.l., Agrate Brianza, MI (US)

(72) Inventor: Paolo Frallicciardi, Salerno (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 155 days.

(21) Appl. No.: 13/720,096

(22) Filed: Dec. 19, 2012

(65) Prior Publication Data

US 2013/0175199 A1    Jul. 11, 2013

(30) Foreign Application Priority Data

Dec. 28, 2011  (IT) ............................ MI2011A2415

(51) Int. Cl.
*B65D 85/00*  (2006.01)
*G06K 19/077*  (2006.01)

(52) U.S. Cl.
CPC ......... *B65D 85/00* (2013.01); *G06K 19/07739* (2013.01); *Y10T 29/49826* (2015.01)

(58) Field of Classification Search
CPC ........... B65D 85/00; G06K 19/07739; G06K 19/077; G06K 19/072; G06K 19/07745; B26D 7/01; Y10T 29/49826

USPC .................................. 206/722; 235/492, 487
See application file for complete search history.

(56) References Cited

U.S. PATENT DOCUMENTS

| 5,362,955 | A | * | 11/1994 | Haghiri-Tehrani | 235/492 |
| 5,531,145 | A | * | 7/1996 | Haghiri-Tehrani | 83/27 |
| 5,757,116 | A | * | 5/1998 | Nishikawa et al. | 235/492 |
| 5,936,227 | A | * | 8/1999 | Truggelmann et al. | 235/492 |
| 6,448,638 | B1 | * | 9/2002 | Fidalgo et al. | 257/679 |
| 6,685,097 | B1 | * | 2/2004 | Housse | 235/492 |
| 7,086,601 | B2 | * | 8/2006 | Dhers et al. | 235/492 |

FOREIGN PATENT DOCUMENTS

| EP | 0638873 A2 | 2/1995 |
| FR | 2783948 A1 | 3/2000 |
| FR | 2806661 A1 | 9/2001 |
| FR | 2826155 A1 | 12/2002 |

\* cited by examiner

*Primary Examiner* — Chun Cheung
(74) *Attorney, Agent, or Firm* — Allen, Dyer, Doppelt, Milbrath & Gilchrist, P.A.

(57) ABSTRACT

A SIM module includes a SIM and a plastic support on which the SIM is attached. A discontinuity channel between the plastic support and the SIM is formed all around the SIM, the discontinuity channel being interrupted in at least two points of the plastic support attaching the SIM to the plastic support. The points are on a short side and on a long side of the SIM.

9 Claims, 11 Drawing Sheets

SIM MODULE

FIELD OF INVENTION

The present invention relates to a Subscriber Identity Module (SIM) and a plastic support whereto the SIM is attached and from which the SIM is detached for usage. More particularly, the invention relates to the structure of a SIM module and to a method for manufacturing it.

BACKGROUND OF THE INVENTION

As known, a SIM is so small that it is attached to a plastic support when it is released from a factory. The SIM and the respective plastic support are also referred to as SIM module. The consumer of the SIM buys the SIM module and detaches the SIM from the plastic support, for usage. For facilitating the detachment, the SIM is attached to the plastic support by one or more precut lines.

Figure 1A:
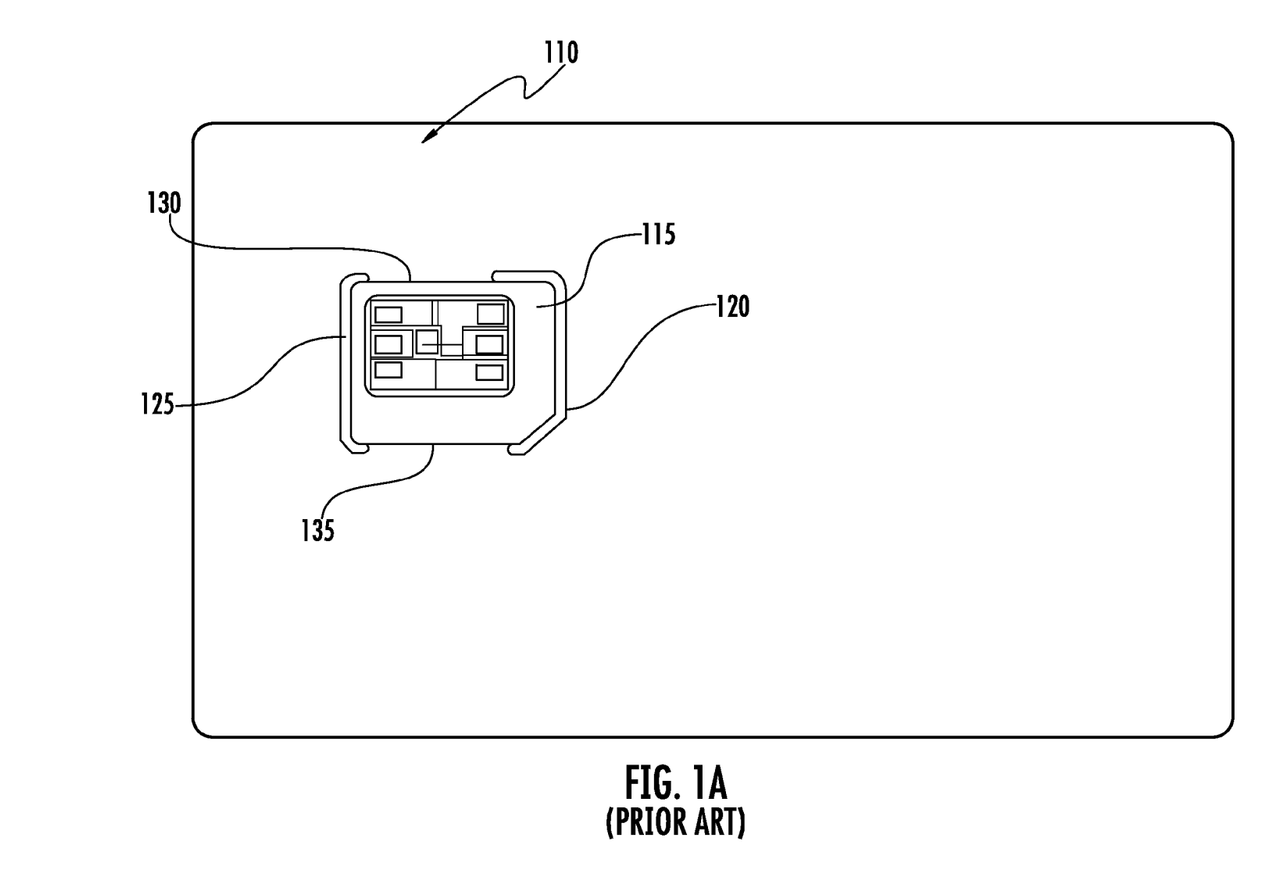
FIG. 1A is a schematic diagram showing a SIM module according to the prior art.
Figure 1B:
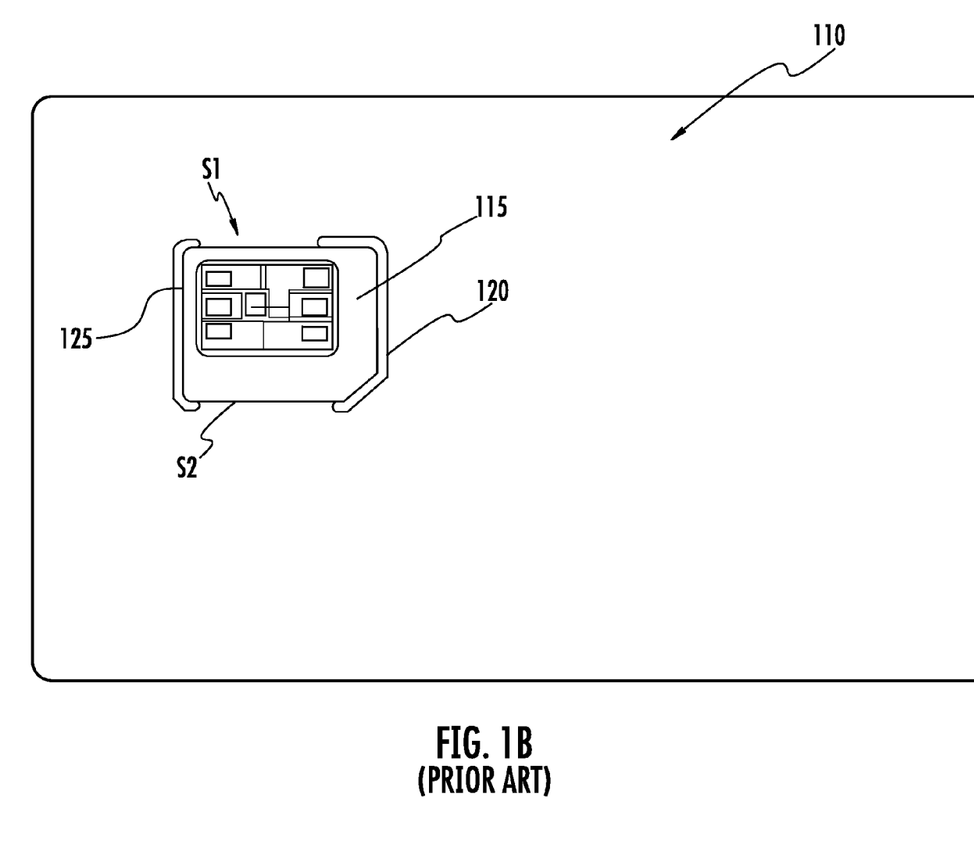
FIGS. 1B-1C are schematic diagrams representing the manufacturing process of the SIM module of FIG. 1A.
Figure 1C:
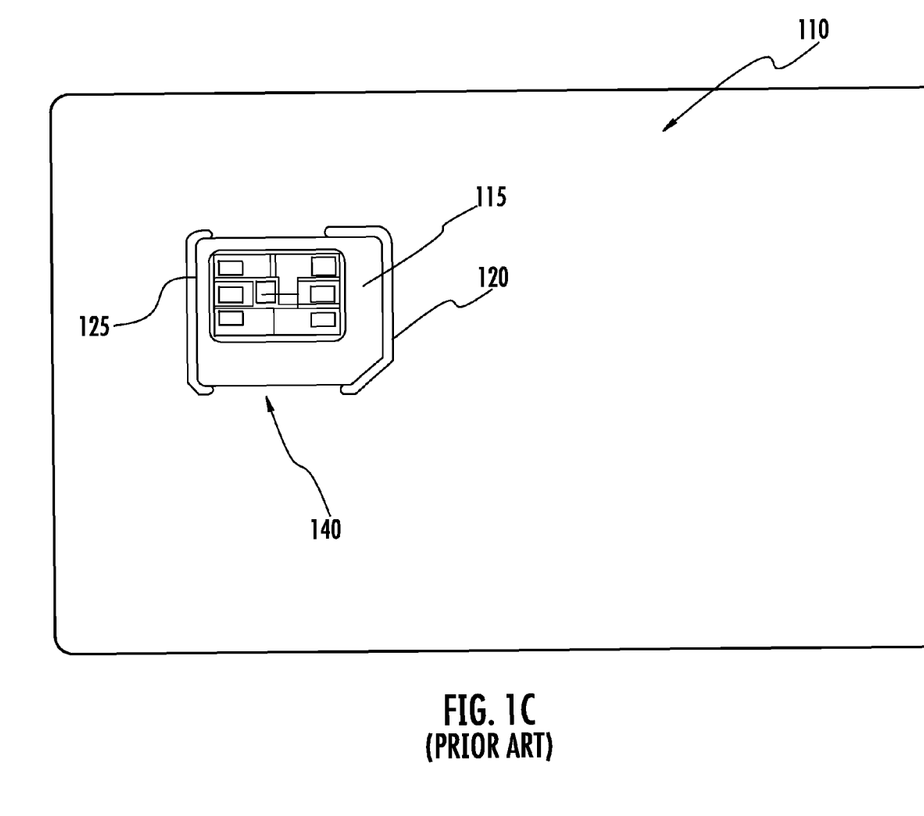

FIG. 1A schematically shows a SIM module with punching holes and precut lines. A card body 110 includes a SIM 115, a mini SIM or micro SIM. Two punch holes 120, 125 on the left and right side of the SIM 115 and two pre-cut lines 130, 135 on top and bottom side of the SIM 115 are provided for facilitating its detachment from the plastic support of the SIM module. FIG. 1B and FIG. 1C schematically show the manufacturing process of the SIM module. The SIM 115 is formed on the plastic support of the module 110 as one part. Then, the target cutting boundary S1, S2 are made, based on the plastic support size and the SIM size and the respective position. The area is usually pre-calculated and it can be corrected based on the error of the manufacturing process.

A portion of the left and right side of the SIM module are removed by a punching process as depicted in FIG. 1C. After the punching process, left hole 125 and right hole 120 are formed just near the SIM 115. In this state, the target cutting boundary S1, S2 still remains on top and bottom side of the SIM 115. The target cutting boundary S1, S2 needs to be processed to form on the top and bottom sides of the SIM 115 pre-cut lines.

Figure 2A:
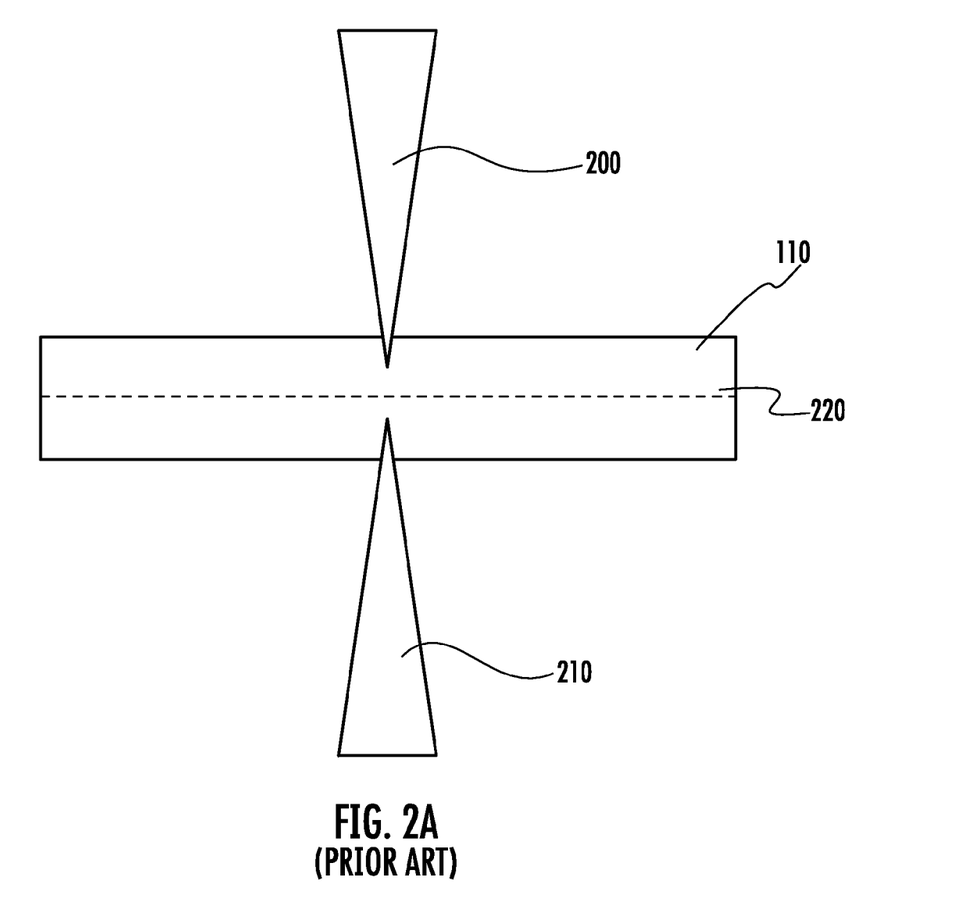
FIG. 2A is a schematic diagram showing a cross section of blades used for a pre-cut process according to the prior art method.

FIG. 2A shows the cross section of the blades used at the pre-cut process. Top blade 200 and bottom blade 210 enter the plastic support 110 and form the pre-cut lines moving along the target cutting boundary. In FIG. 2A, the top blade 200 and the bottom blade 210 are arranged symmetrically based on the central plane 110 of the support.

Due to the symmetry of the blades, the final product with the pre-cut line can obtain reliability and easily detachable characteristics. However, a precise symmetry can be obtained in an exceptionally ideal situation. In the real manufacturing process, there is asymmetry on the top blade 200 and the bottom blade 210, caused by undesirable and unpredictable circumstances.

Figure 2B:
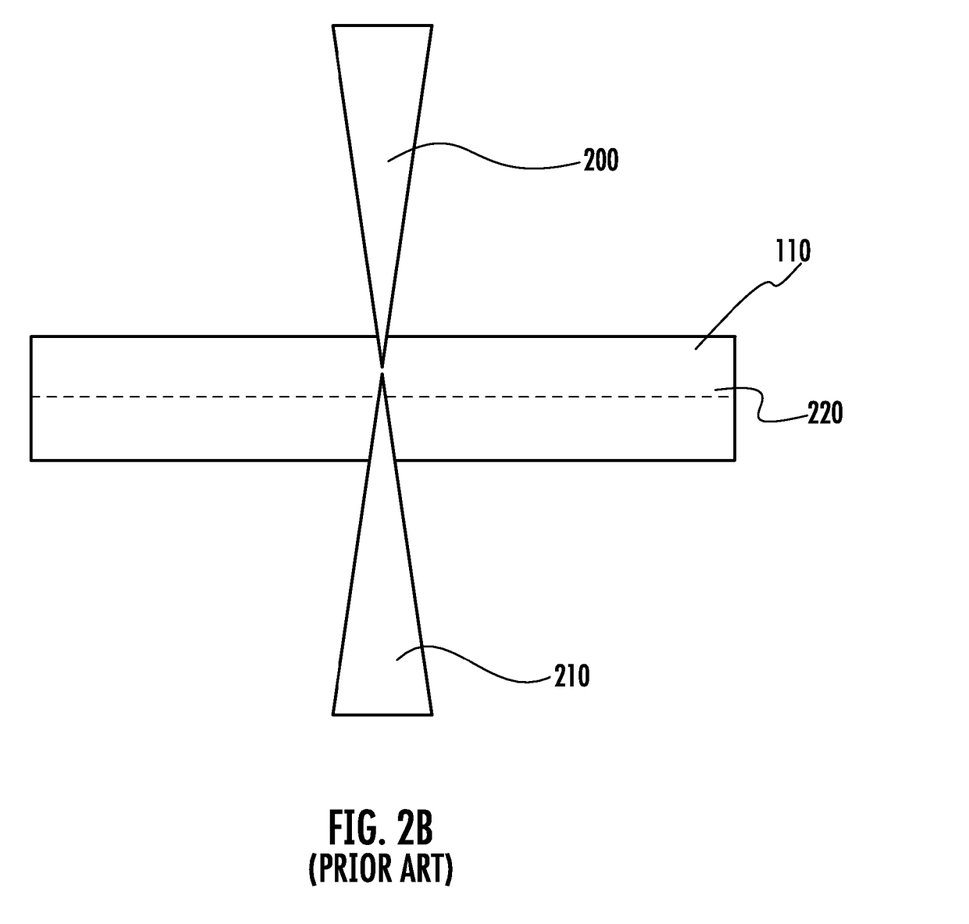
FIGS. 2B-2D are schematic diagrams illustrating an asymmetry occurring on the top and bottom blades of FIG. 2A.
Figure 2C:
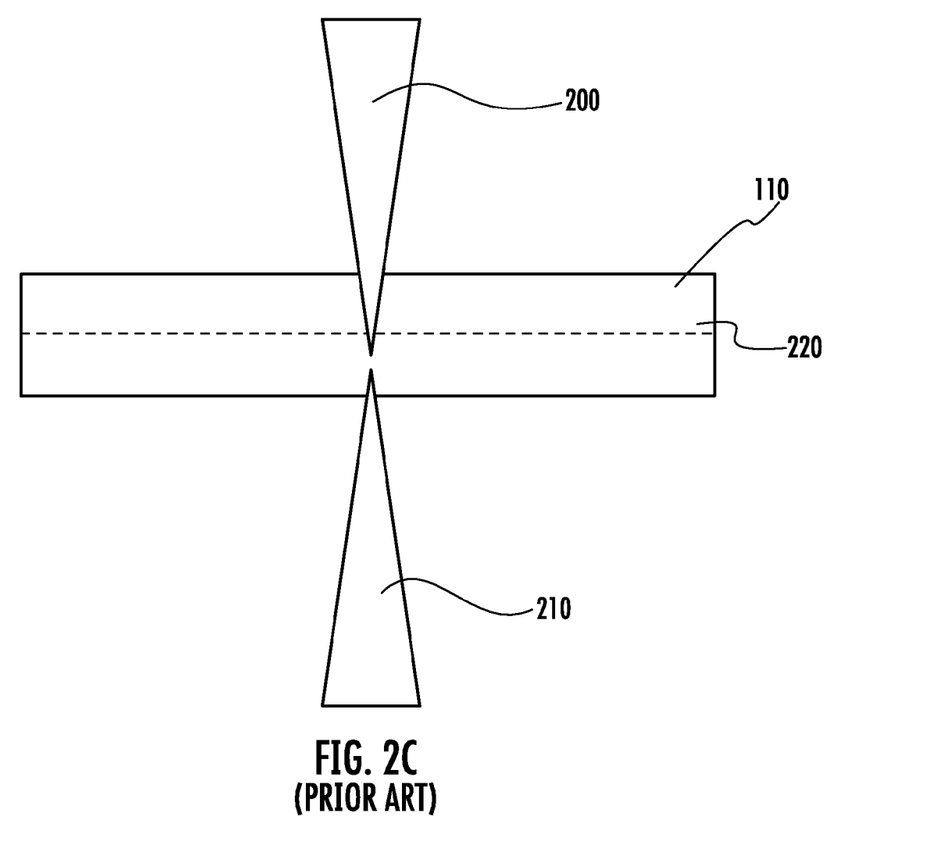
Figure 2D:
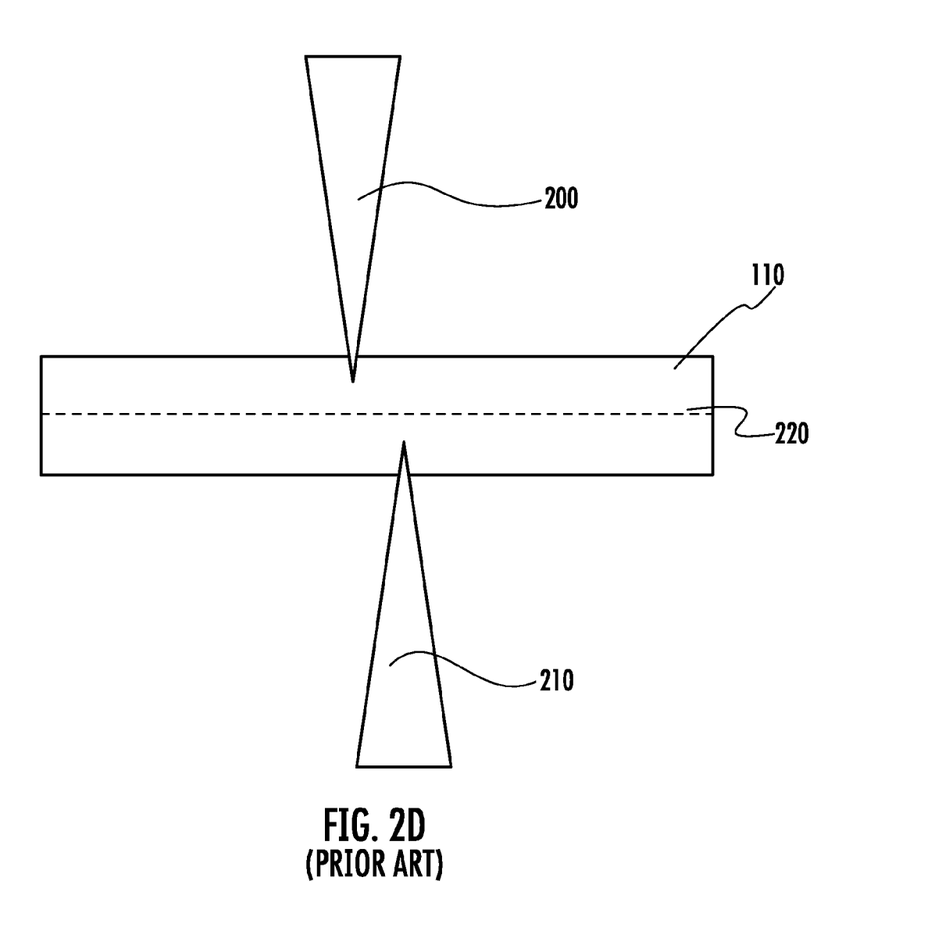

FIGS. 2B, 2C, and 2D schematically illustrate examples showing the asymmetry occurring on the top and bottom blades. In FIG. 2B, the bottom blade 210 penetrates the central plane 220, which causes a deeper bottom pre-cut line on the full-sized card 110. In FIG. 2C, the top blade 200 penetrates the central plane 220, which causes a deeper top pre-cut line on the full-sized card 110. In FIG. 2D, the top blade 200 and the bottom blade 210 are not aligned in a line, which causes top pre-cut line and bottom pre-cut line to be formed asymmetrically in a different position. These kinds of errors happen frequently and are difficult to detect.

Moreover, the asymmetrical pre-cut lines cause overbalanced stress distribution on the SIM 115 and local bending. The bending introduces stress localized on the micro-module of the SIM and causes problems during card transport on the next process. In an extreme case where a pre-cut line is absent or is formed ineffectively, it may cause damage during the plug-in detach.

Other technical problems may be associated with the pre-cut line area. More particularly, the manufacturing process requires two process steps, which is more costly. The blade penetration is a mechanical process, and thus the production is frequently impacted from the blade stopping in it's rail, due to the powder or loss of lubrication. Furthermore, it is not easy to detect the asymmetrical pre-cut line before doing a destructive mechanical test. Continuous changing of blades, rail cleaning, and fine tuning adjustments may increase the production cost.

French patent No. 2806661 suggested a SIM having three linking pieces which are connected to the plastic support. Two of the three linking pieces are disposed on one side of the SIM and the other is disposed on the opposite side of the SIM card. The two linking pieces are disposed symmetrically on the other opposite side's linking piece. Although it is not drawn clearly in the FIG. 2, the linking pieces of the bottom side each have a pre-cut, to let the SIM be detached from the plastic support.

Moreover, since the SIM comprises three linking pieces, one of which is arranged in the opposite side from the other two linking pieces, the consumer should apply a strong force to break at least one of the linking pieces at first.

SUMMARY OF INVENTION

The problem addressed by the present embodiments is to provide a SIM module and a corresponding method to manufacture it, wherein a SIM of the module is safely attached to a respective plastic support of the module, this having a structure facilitating the detachment of the SIM, with little force applied on the SIM, to prevent possible damage on the respective electrical components.

An object of the present embodiments is to simplify the manufacturing of a SIM module by forming a discontinuity channel which separates the plastic support from a respective SIM and leaving only two points of the plastic support, in the channel, for attaching the SIM to the support, such point being easily broken and without applying strong forces on the SIM, for detaching the SIM. Advantageously, precut lines are avoided in the manufacturing process and the detachment of the SIM is facilitated.

More particularly, the technical problem reported above is addressed by a SIM module including a SIM and a plastic support on which the SIM is attached, wherein a discontinuity channel between the plastic support and the SIM is formed all around the SIM. The discontinuity channel is interrupted in at least two points of the plastic support attaching the SIM to the plastic support, wherein the points are on a short side and on a long side of the SIM. Advantageously, the position of the points avoids stresses on the chip of the SIM or on its electrical contacts, since no pressure or bending is exerted on the chip or contact for breaking the points.

In an aspect of the embodiments, each of the points is a converging point of a delta shaped portion of the plastic support which is arranged to remain enclosed to the plastic support when the SIM is detached. Advantageously, the wider part of the delta portion is towards the plastic support and the thinner part towards the SIM, so that the detachment of the SIM is facilitated and a precise breaking of the support in the points may be assured.

More particularly, in one aspect of the embodiments, a projection of the discontinuity channel is delimited within the SIM and laterally to the interrupting points, to let the plastic support be broken exactly in the points, when the SIM is detached. The form of the channel near the point improves the precision of rupture along the SIM edges and may render its detachment even easier.

In one embodiment, a depth of the projections in the SIM decreases at a predetermined distance from the interruption point, preferably proportionally to the distance. This shape of the discontinuity channel improves the detachability. The channel has a predetermined width, preferably between 1/7 and 1/15 of the short size of the SIM.

According to another aspect, a conjunction line between the two points of the support does not cross an integrated circuit of the SIM. This configuration of the points may avoid the stress on the integrated circuit, when the SIM is detached.

At least an additional point attaching the SIM to the plastic support may be provided. This additional point is preferably along one of the sides of the SIM not involved by the other two points. However, nothing prevents that two or more points are provided on the same side of the SIM. This configuration of points may advantageously improve the attachment of the SIM to the plastic support and thus its protection before usage, without complicating its manufacturing or detachment.

More particularly, the SIM is attached to a frame body of a full-sized card plastic support, the SIM being arranged in a portion of the frame body and comprising a first connecting portion disposed on a first side of the SIM card, attaching the SIM card to the frame body, a second connecting portion disposed on a second side of the SIM card, attaching the SIM card to the frame body, the second side being adjacent to the first side. A first hole surrounds a portion of the SIM card arranged between the first connecting portion and the second connecting portion and a second hole surrounds a portion of the SIM card arranged between the first connecting portion and the second connecting portion, wherein the first connecting portion and the second connecting portion have a pointed shape. The connecting portions form the interruption point of the discontinuity channel and the first and second holes are holes through the plastic support.

Since the SIM is attached to the frame body without pre-cut lines, the technical problem discussed above may be overcome. Moreover, since the SIM comprises two connecting portions with a pointed shape, it becomes easier to detach it by rotation back and forth, preferably around an axis formed connecting the two connecting portions. Less force is required to cut the SIM from the frame body of full-sized card.

In another aspect, in the SIM, the first side is shorter than the second side, and the first connecting portion is disposed approximately at the center of the first side. The second connecting portion is disposed on the second side at farther position from the first side than the center of the second side. The first and second connecting portions may enhance the stability of the attachment of the SIM cards.

In another aspect, the first connecting portion has a triangular shape whose tip is connected to the SIM. The second connecting portion may have a triangular shape whose tip is connected to the SIM. The above shape may prevent the presence of an offshoot after snapping of the SIM from the body frame of full-sized card plastic support.

In another aspect, the SIM has a recess formed inside the first hole near the tip of the first connecting portion and has another recess formed inside the second hole near the tip of the first connecting portion. The above shape can further prevent presence of an offshoot after snapping of the SIM from the body frame of full-sized card.

In another aspect, the recesses extends no longer than the bottom side's width of the triangular shape of the first connecting portions. The minimum recess size makes the lateral side of the SIM card planar and protects undesirable substances to be filled in the recess.

In another aspect, the SIM has a recess formed inside the first hole near the tip of the second connecting portion and has another recess formed inside the second hole near the tip of the second connecting portion. The recesses extend no longer than the bottom side's width of the triangular shape of the second connecting portions.

According to another aspect, a method for producing the SIM module includes forming the SIM on a frame body of a plastic support and punching the frame body so that only two points, on adjacent side of the SIM, attach the SIM to the support.

Further advantages and features of the method and SIM module according to the present invention will be apparent from the description given here below only for exemplificative purpose and without limiting the scope of protection of the present embodiments.

DETAILED DESCRIPTION OF THE PREFERRED EMBODIMENTS

Figure 3:
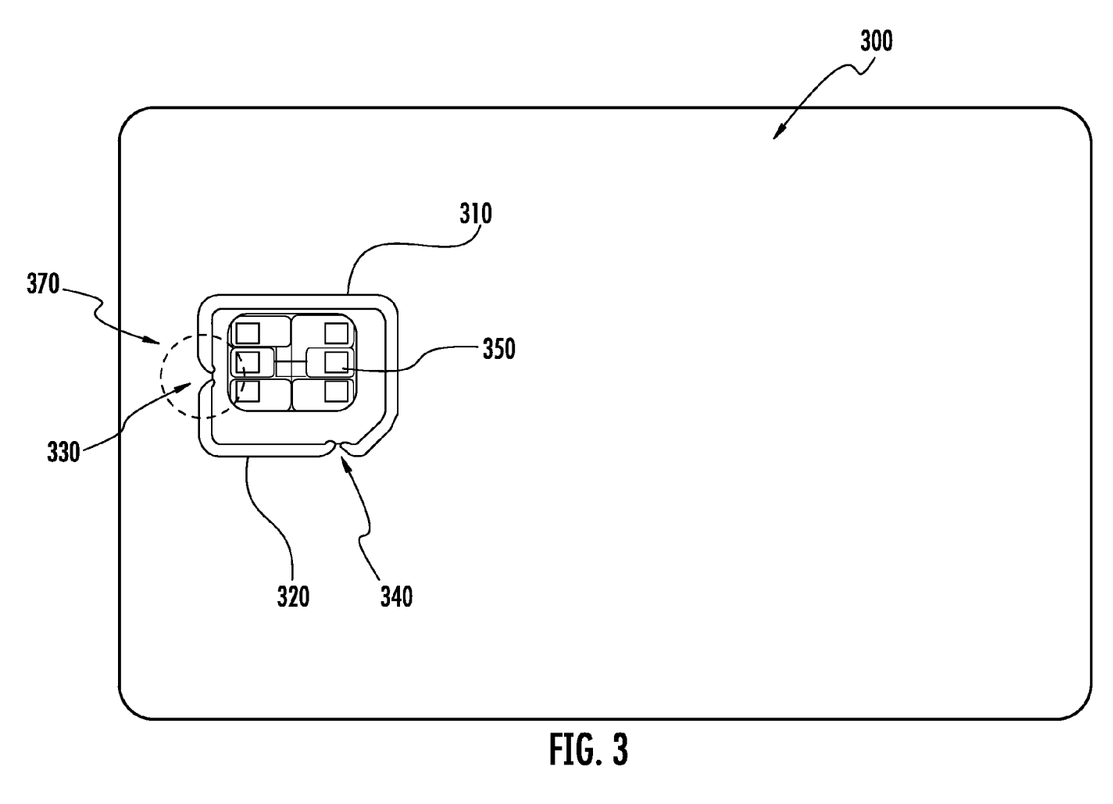
FIG. 3 is a schematic diagram illustrating the SIM module according to the present embodiments.

FIG. 3 schematically represents a SIM module according to the present embodiments. A SIM 350 is attached to a frame body of a full-sized card plastic support 300, also indicated as plastic support 300. The SIM 350 is arranged in a portion of the frame body, for example, in a left of a half portion of the plastic support 300. The SIM 350 comprises a first connecting portion 330 on a first side, attaching the SIM 350 to the frame body 300.

The SIM 350 also comprises a second connecting portion 340 disposed on a second side of the SIM 350 and attaching the SIM 350 to the frame body 300. The first side and second side of the SIM 350 are adjacent to each other.

A first hole 310 is delimited in the plastic support 300, surrounding a portion of the SIM 350 arranged between the first connecting portion 330 and the second connecting portion 340. The support 300 further comprises a second hole 320 surrounding another portion of the SIM 350 arranged between the first connecting portion 330 and the second connecting portion 340, the first hole 310 being disposed in opposite position from the second hole 320. The first hole 310 and the second hole 320 may be formed by a punching process.

The first connecting portion 330 and the second connecting portion 340 have a pointed shape, as no pre-cut lines are present. Preferably, the first connection portion 330 is connected to the SIM 350 with as small contact area as possible. The first side where the first connecting portion 330 is disposed is shorter than the second side where the second connecting portion 340 is disposed. Preferably, the first connecting portion 330 is disposed approximately at the center of the first side and the second connecting portion 340 on the second side at a farther position from the first side than the center of the second side.

The first connecting portion 330 may have a triangular shape whose tip is connected to the SIM 350. Similarly, the second connecting portion 340 has a triangular shape whose tip is connected to the SIM 350. This triangular shape is represented in detail in FIG. 4A, which is a magnified view of the first connecting portion 370 of FIG. 3.

Figure 4A:
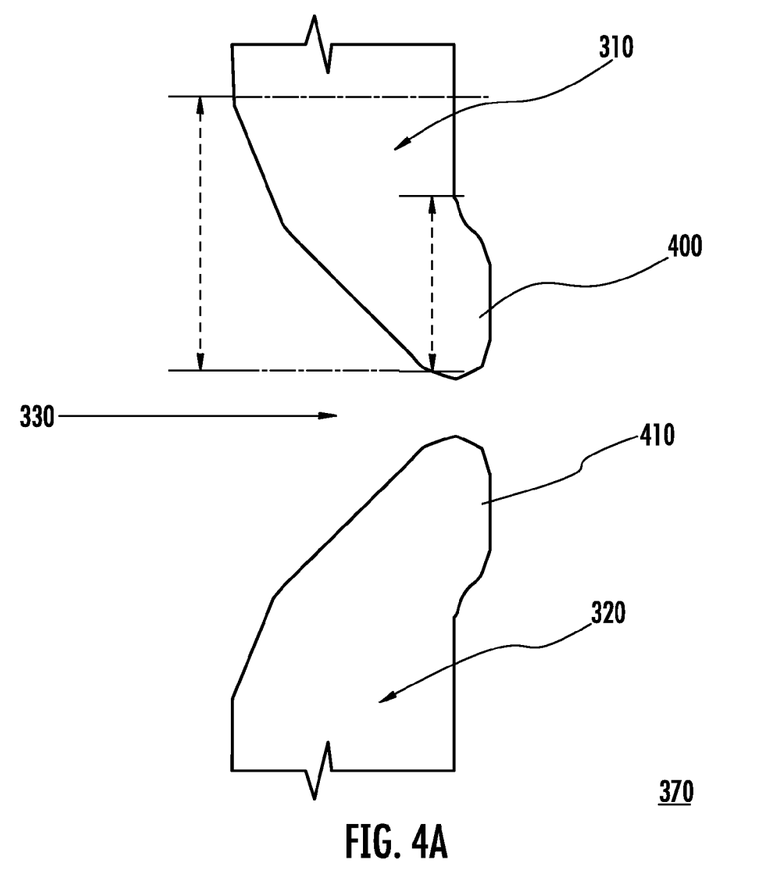
FIG. 4A is an enlarged view illustrating in greater detail the SIM module of FIG. 3.

The SIM 350 has a recess 400 formed by the first hole 310 near the tip of the first connecting portion 330 and another recess 410 formed by the second hole 320 near the tip of the first connecting portion 330. The recess can prevent presence of offshoot after snapping of the SIM from the body frame of the plastic support. The recesses 400, 410 extend no longer than the bottom side's width of the triangular shape of the first connecting portion 330, as depicted in FIG. 4A. The width of the recess 400 vertically drawn in FIG. 4A is smaller than the width of the base of triangle 330.

In a similar way, the SIM 350 has a recess formed inside the first hole 310 near the tip of the second connecting portion 340 and has another recess formed inside the second hole 320 near the tip of the second connecting portion 340. The recesses extend no longer than the bottom side's width of the triangular shape of the second connecting portion 340.

Figure 4B:
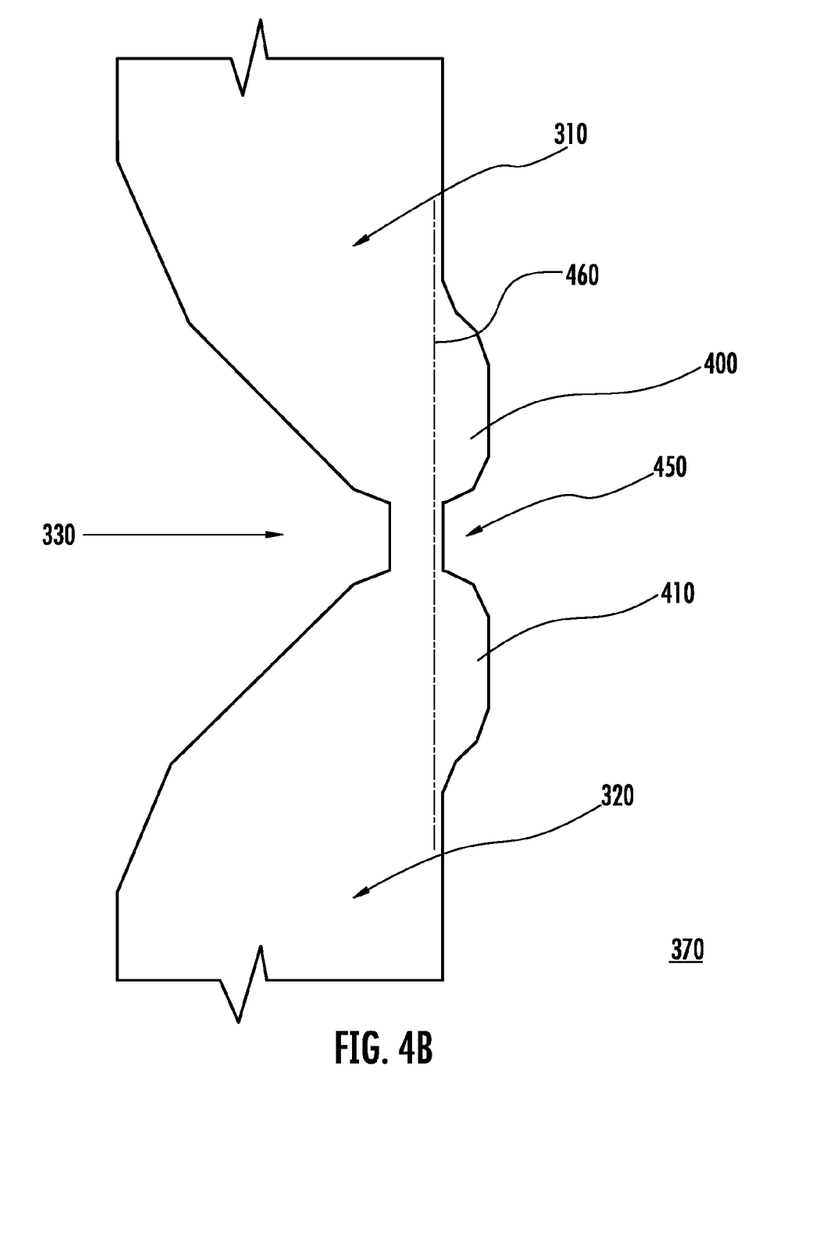
FIG. 4B is an enlarged view illustrating a first connecting portion of a SIM after detaching from the frame body of plastic support, according to the present embodiments.

FIG. 4B schematically shows the magnified first connecting portion after the SIM card is detached from the frame body of the plastic support. Due to the two recesses 400, 410, the offshoot 450 extends no longer than the planar line 460 which is formed parallel to the first side of the SIM 350. As the recesses 400, 410 occupy small areas with respect to the SIM area, the cut side can be regarded as planar.

Figure 5:
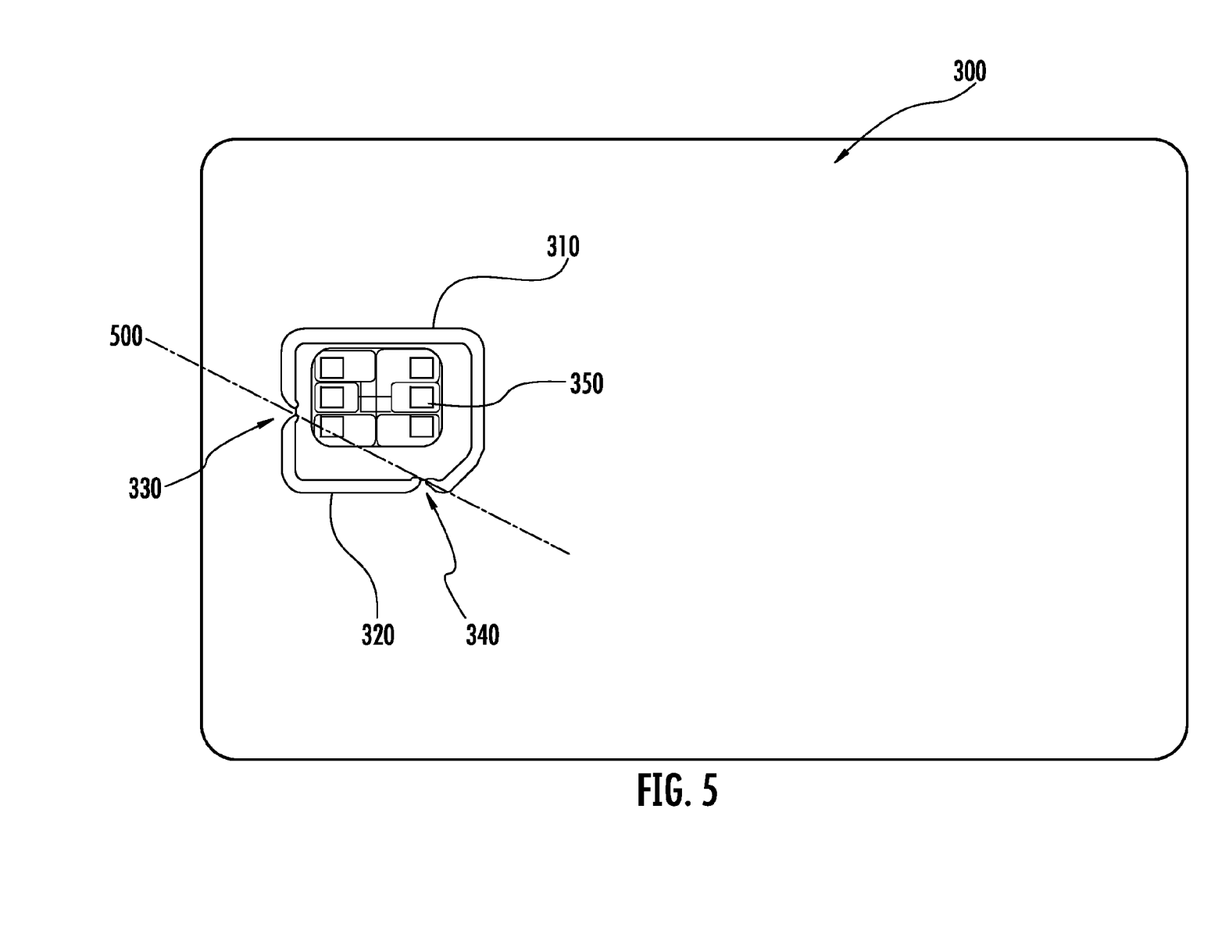
FIG. 5 is a schematic diagram showing an axis on which the SIM card is snapped and detached from the frame body, according to the present embodiments.

FIG. 5 schematically shows an axis on which the SIM is snapped and detached from the frame body. The SIM 350 is snapped on the axis 500 which extends from the first connecting portion 330 to the second connecting portion 340. The customer who has bought the SIM module can snap the SIM 350 and swing it back and forth on the axis 500 several times. Then, the first and second connection portion 330 and 340 are worn out until the SIM 350 is detached from the frame body of the support 300.

The SIM according to the present embodiments may be manufactured with a punching process. The SIM 350 is formed on the frame body of the plastic support 300 and then the frame body 300 is punched, so that the first and second holes 310, 320 are formed along the outline of the SIM 350. Since the SIM may be manufactured by a punching process without a pre-cut, the manufacturing cost decreases. The undesirable artifact caused by the pre-cutting manufacture, such as unbalanced stress applied to the SIM card, can be prevented by the punching process.

Advantageously, according to the embodiments, since the SIM comprises two connecting portions with a pointed shape, it becomes easier to detach the SIM by moving it back and forth based on the axis formed by the two connecting portions. Moreover, the recess near the connecting portions prevents the presence of offshoot after snapping of the SIM from the body frame of a full-sized card. The minimum recess's size makes the lateral side of the SIM planar and protects undesirable substances from being filled in the recess.

Furthermore, since the SIM comprises two connecting portions with a pointed shape, it becomes easier to detach the SIM by rotating it back and forth based on the axis formed by the two connecting portions. Less force is required to detach the SIM from the frame body of a full-sized card plastic support.

That which is claimed:

1. A Subscriber Identity Module (SIM) comprising:
   a SIM having at least one long side and one short side;
   a plastic support on which the SIM is attached;
   a discontinuity channel between the plastic support and the SIM, and around the SIM, said discontinuity channel being interrupted by only first and second attachment points each defined by a triangular shaped portion of said plastic support, the first attachment point being at the short side and the second attachment at the long side of the SIM; and
   a lateral recess formed on each side of each attachment point and extending no longer than an edge of a base of the triangular shaped portion to let the plastic support be broken between the breaking point and the opposing breaking point without precut lines when the SIM is detached, a minimum size of each lateral recess makes the long side and the short side of the SIM planar and protects undesirable substances to be filled in each lateral recess.

2. The SIM module according to claim 1, wherein a depth of said lateral recess decreases proportionally to a distance from said attachment point.

3. The SIM module according to claim 1, wherein said discontinuity channel has a width between 1/7 and 1/15 of said short side of the SIM.

4. A Subscriber Identity Module (SIM) comprising:
   a SIM;
   a plastic support on which the SIM is attached, said plastic support comprising a full-sized card defining a frame body, the SIM is attached to and arranged within a portion of the frame body of said plastic support; and
   a discontinuity channel between the plastic support and the SIM, and around the SIM, said discontinuity channel being interrupted by only first and second connecting portions each having a triangular shape;
   the SIM comprising
     the first connecting portion being at a first side of the SIM, attaching the SIM to the frame body;
     the second connecting portion being at a second side of the SIM, attaching the SIM to the frame body, the second side being adjacent to the first side,
     a lateral recess formed on each side of each connecting portion and extending no longer than an edge of a base of each connecting portion to let the plastic support be broken between the breaking point and the opposing breaking point without precut lines when the SIM is detached, a minimum size of each lateral recess makes the long side and the short side of the SIM planar and protects undesirable substances to be filled in each lateral recess;
   the discontinuity channel comprising a first hole surrounding a first portion of the SIM arranged between the first connecting portion and the second connecting portion, and a second hole surrounding a second portion of the SIM arranged between the first connecting portion and the second connecting portion.

5. The SIM module according to claim 4, wherein said first side is shorter than said second side, and said first connecting portion is disposed approximately at a center of said first side.

6. The SIM module according to claim 5, wherein said second connecting portion is arranged at said second side at a farther position from said first side than a center of said second side.

7. A method for manufacturing a SIM module, comprising:

embedding a SIM in a plastic support; and forming a discontinuity channel between the plastic support and the SIM, and around the SIM, while leaving first and second triangular shaped attachment points of the plastic support, which interrupt the discontinuity channel and attach the SIM to the plastic support, and a lateral recess formed on each side of each attachment point and extending no longer than a width of a base of each attachment point and extending no longer than an edge of a base of each attachment point to let the plastic support be broken between the breaking point and the opposing breaking point without precut lines, a minimum size of each lateral recess makes a long side and a short side of the SIM planar and protects undesirable substances to be filled in each lateral recess, the first triangular shaped attachment point being at the short side and the second triangular shaped attachment point being at the long side of the SIM.

8. The method according to claim 7, wherein a depth of each lateral recess in the SIM decreases proportionally to a distance from each triangular shaped attachment point.

9. The method according to claim 7, wherein said discontinuity channel has a width between 1/7 and 1/15 of said short side of the SIM.

* * * * *

UNITED STATES PATENT AND TRADEMARK OFFICE
CERTIFICATE OF CORRECTION

PATENT NO. : 9,487,343 B2  
APPLICATION NO. : 13/720096  
DATED : November 8, 2016  
INVENTOR(S) : Paolo Frallicciardi Page 1 of 1

It is certified that error appears in the above-identified patent and that said Letters Patent is hereby corrected as shown below:

In the Claims

Column 8, Lines 3-4, Claim 7    Delete: "a width of a base of each attachment point and extending no longer than"

Signed and Sealed this  
Twenty-eighth Day of February, 2017

Michelle K. Lee  
*Director of the United States Patent and Trademark Office*